(12) United States Patent
Yuan et al.

(10) Patent No.: US 11,682,532 B2
(45) Date of Patent: Jun. 20, 2023

(54) ELECTRONIC DEVICE, WATERPROOF BUTTON STRUCTURE, AND WATERPROOF PARTITION

(71) Applicants: HONGFUJIN PRECISION ELECTRONICS (ZHENGZHOU) CO., LTD., Zhengzhou (CN); HON HAI PRECISION INDUSTRY CO., LTD., New Taipei (TW)

(72) Inventors: Bo-Duo Yuan, Shenzhen (CN); Fu-Pin Hsieh, New Taipei (TW); Hong Liu, Zhengzhou (CN); Hai-Tao Wang, Shenzhen (CN); Zhen-Hai Mei, Zhengzhou (CN)

(73) Assignees: HONGFUJIN PRECISION ELECTRONICS (ZHENGZHOU) CO., LTD., Zhengzhou (CN); HON HAI PRECISION INDUSTRY CO., LTD., New Taipei (TW)

( * ) Notice: Subject to any disclaimer, the term of this patent is extended or adjusted under 35 U.S.C. 154(b) by 786 days.

(21) Appl. No.: 16/683,737

(22) Filed: Nov. 14, 2019

(65) Prior Publication Data
US 2021/0043399 A1      Feb. 11, 2021

(30) Foreign Application Priority Data

Aug. 8, 2019    (CN) .......................... 201910732232.9

(51) Int. Cl.
*H01H 13/06*    (2006.01)
*H01H 13/14*    (2006.01)

(52) U.S. Cl.
CPC ............ *H01H 13/06* (2013.01); *H01H 13/14* (2013.01)

(58) Field of Classification Search
CPC ........ H01H 13/86; H01H 13/14; H01H 13/06; H01H 2225/028; H01H 2223/003; H01H 2231/022; H01H 2231/042; H01H 2223/002
See application file for complete search history.

(56) References Cited

U.S. PATENT DOCUMENTS

| 8,440,922 | B2* | 5/2013 | Yeates | ..................... H01H 15/04 200/16 R |
| 8,853,574 | B2* | 10/2014 | Christophy | .............. H01H 9/04 200/302.1 |
| 9,058,937 | B2* | 6/2015 | Wang | ..................... H01H 9/182 |
| 9,251,975 | B1* | 2/2016 | Brandau | ................ H01H 13/14 |
| 2003/0160669 | A1* | 8/2003 | Trandafir | ............. H01H 13/702 335/78 |

(Continued)

FOREIGN PATENT DOCUMENTS

TW          201214479 A      4/2012

*Primary Examiner* — Edwin A. Leon
(74) *Attorney, Agent, or Firm* — ScienBiziP, P.C.

(57) ABSTRACT

A waterproof button structure includes a housing, a cover plate, and a waterproof partition. The housing includes a button switch. The cover plate covers the button switch. The cover plate includes a pressable button. The button switch is in one-to-one correspondence with the button. The waterproof partition is located between the housing and the cover plate. A waterproof film of the waterproof partition is adjacent to the cover plate. A waterproof foam of the waterproof partition is adjacent to the housing. When the button is pressed, the button is abutted by the waterproof film, and the button switch is activated.

13 Claims, 4 Drawing Sheets

(56) References Cited

U.S. PATENT DOCUMENTS

| | | | |
|---|---|---|---|
| 2008/0073186 A1* | 3/2008 | Kenmochi | H04M 1/22 |
| | | | 200/341 |
| 2012/0020045 A1* | 1/2012 | Tanase | H01H 13/86 |
| | | | 200/600 |
| 2017/0104320 A1* | 4/2017 | Thompson | H02G 3/14 |

* cited by examiner

ELECTRONIC DEVICE, WATERPROOF BUTTON STRUCTURE, AND WATERPROOF PARTITION

FIELD

The subject matter herein generally relates to waterproof structures, and more particularly to a waterproof button structure for an electronic device.

BACKGROUND

Electronic products require waterproof button structures, wherein O-rings made of rubber are generally used. However, structures of the O-ring may be complicated, which is not cost-effective. Furthermore, the O-ring will become loose over time.

BRIEF DESCRIPTION OF THE DRAWINGS

Implementations of the present disclosure will now be described, by way of embodiments, with reference to the attached figures.

DETAILED DESCRIPTION

Figure 1:
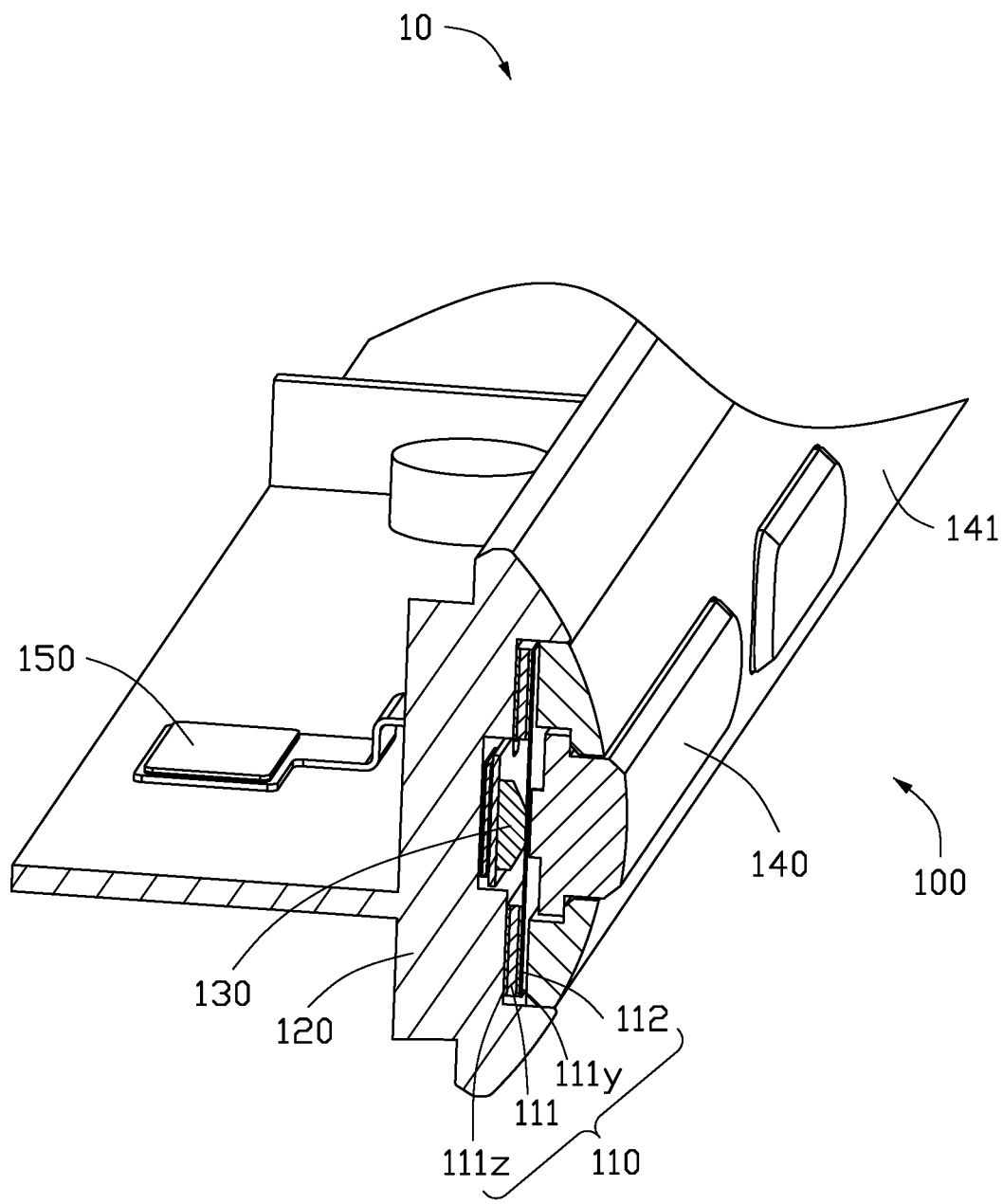
FIG. 1 is an isometric, cutaway view of an embodiment of an electronic device.

It will be appreciated that for simplicity and clarity of illustration, where appropriate, reference numerals have been repeated among the different figures to indicate corresponding or analogous elements. Additionally, numerous specific details are set forth in order to provide a thorough understanding of the embodiments described herein. However, it will be understood by those of ordinary skill in the art that the embodiments described herein can be practiced without these specific details. In other instances, methods, procedures and components have not been described in detail so as not to obscure the related relevant feature being described. The drawings are not necessarily to scale and the proportions of certain parts may be exaggerated to better illustrate details and features. The description is not to be considered as limiting the scope of the embodiments described herein.

Several definitions that apply throughout this disclosure will now be presented.

The term "coupled" is defined as connected, whether directly or indirectly through intervening components, and is not necessarily limited to physical connections. The connection can be such that the objects are permanently connected or releasably connected. The term "substantially" is defined to be essentially conforming to the particular dimension, shape, or other word that "substantially" modifies, such that the component need not be exact. For example, "substantially cylindrical" means that the object resembles a cylinder, but can have one or more deviations from a true cylinder. The term "comprising" means "including, but not necessarily limited to"; it specifically indicates open-ended inclusion or membership in a so-described combination, group, series and the like.

FIG. 1 shows an embodiment of an electronic device 10. The electronic device 10 may be a watch, a wristband, a mobile phone, a notebook computer, or a tablet computer having a waterproof function. As shown in FIG. 1, the electronic device 10 is a mobile phone. The electronic device 10 includes a waterproof button structure 100 that can be applied to a power button, a volume button, and the like of the electronic device 10.

Figure 2:
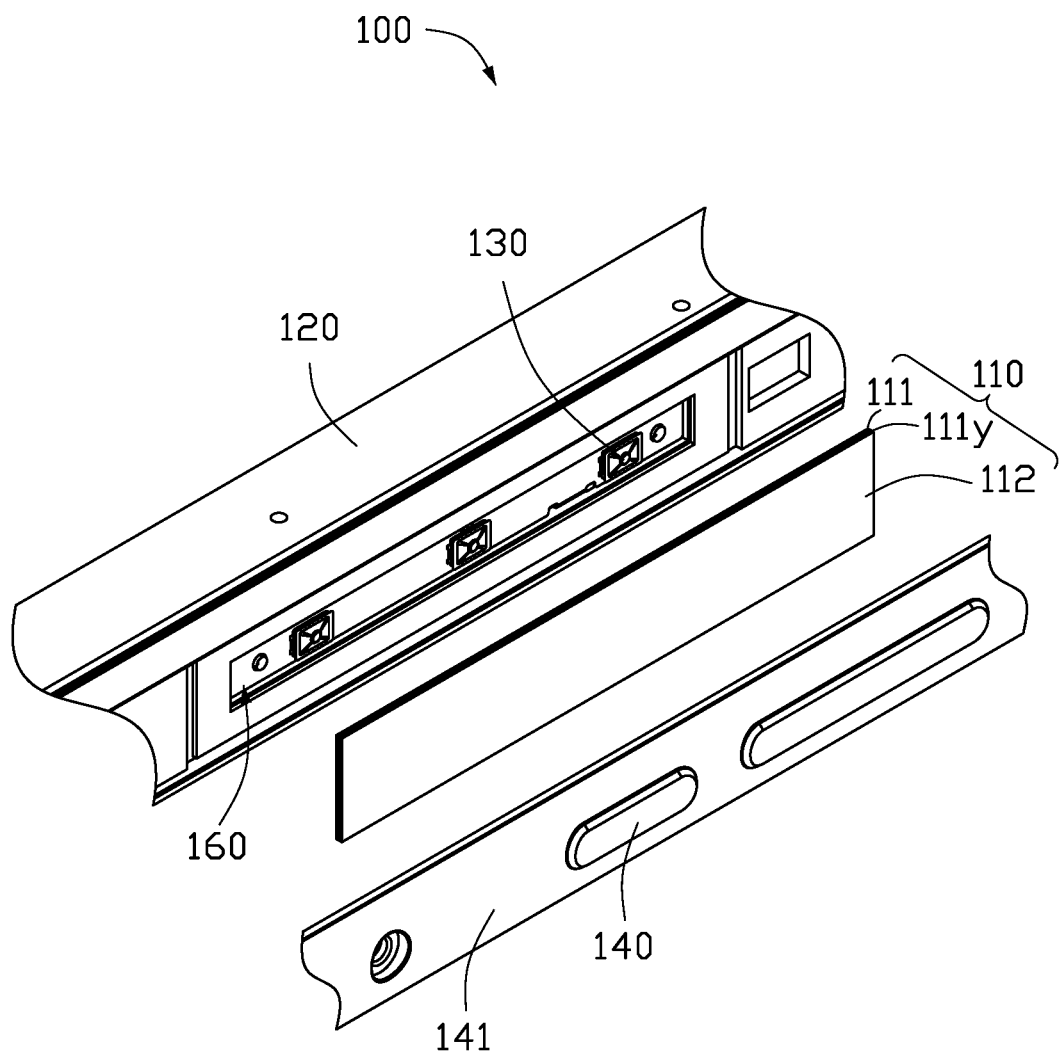
FIG. 2 is an exploded, isometric view of a waterproof button structure of the electronic device.

Referring to FIG. 2, the waterproof button structure 100 includes a housing 120 on which at least one button switch 130 is mounted. The waterproof button structure 100 further includes a cover plate 141. The cover plate 141 is covered over the button switch 130. The cover plate 141 includes at least one button 140 that can be actively pressed. The button 140 is in one-to-one correspondence with the button switch 130. The waterproof button structure 100 further includes a waterproof partition 110 located between the housing 120 and the cover plate 141. A waterproof film 112 of the waterproof partition 110 is adjacent to the cover plate 141, and a waterproof foam 111 of the waterproof partition 110 is adjacent to the housing 120. When the button 140 is pressed, the button 140 is abutted by the waterproof film 112, and the button switch 130 is activated.

Figure 3:
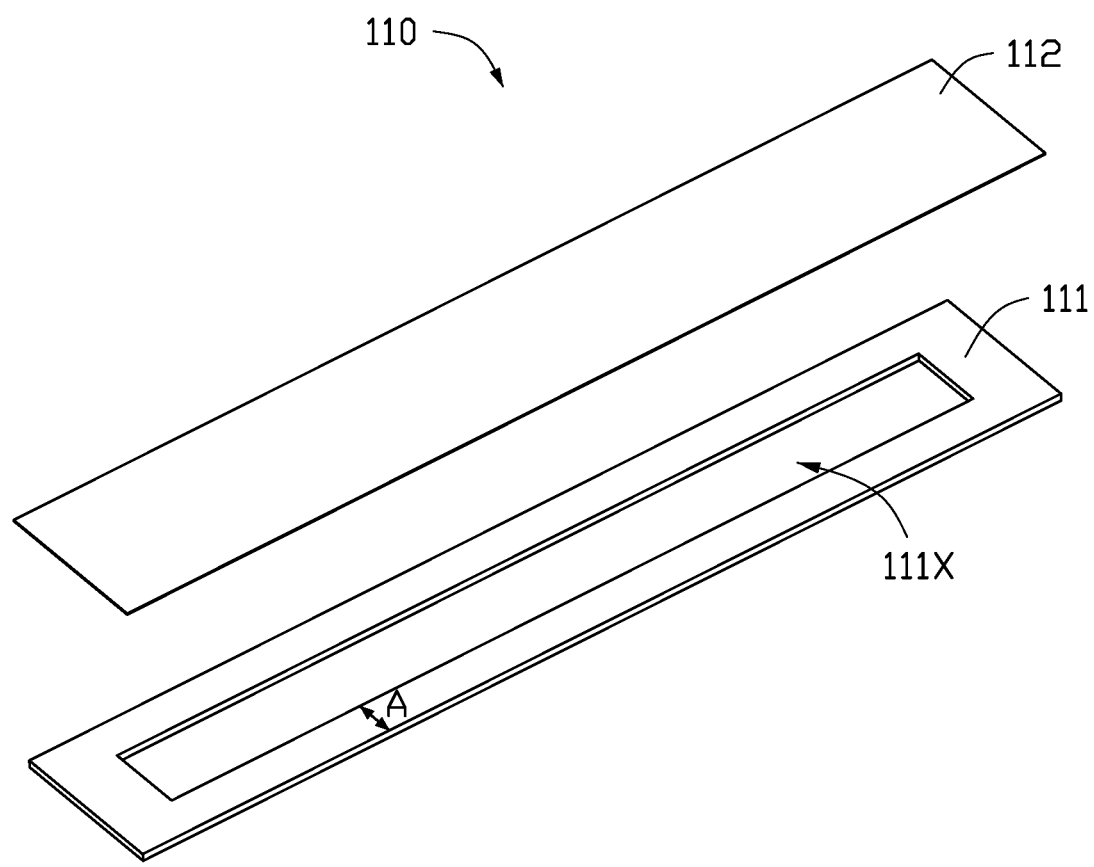
FIG. 3 is an exploded, isometric view of a waterproof partition of the waterproof button structure.
Figure 4:
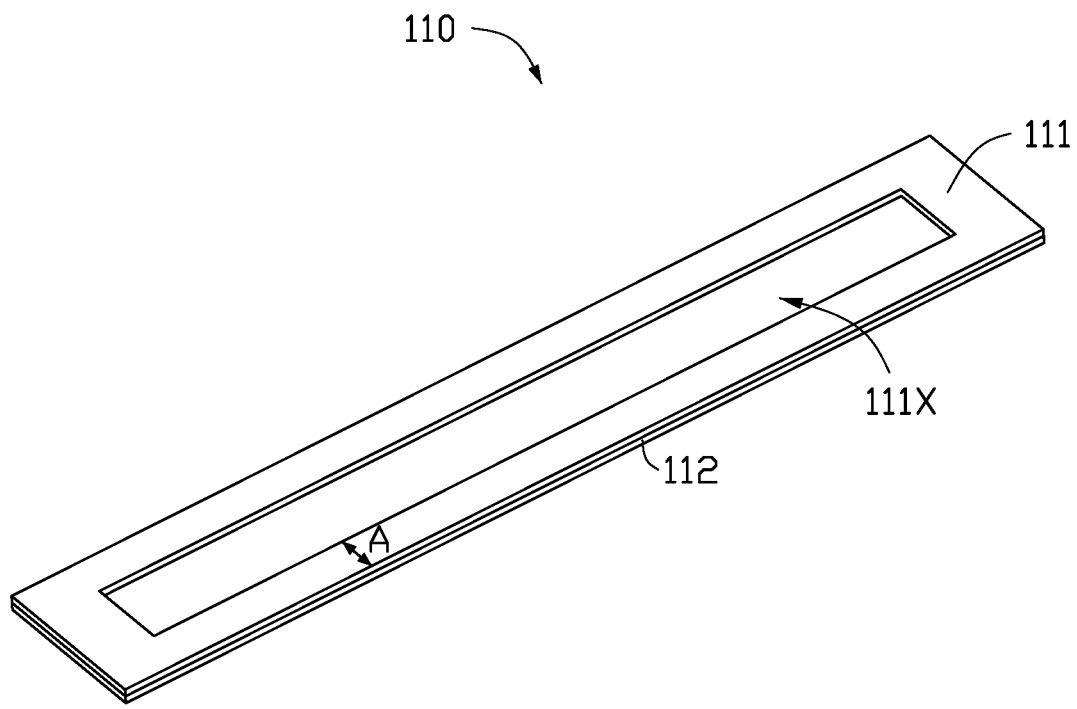
FIG. 4 is an assembled, isometric view of the waterproof partition in FIG. 3.

Referring to FIG. 3 and FIG. 4, the waterproof foam 111 is substantially hollow rectangular shaped. The waterproof foam 111 is formed on one surface of the waterproof film 112 and covers a periphery of the waterproof film 112.

The waterproof foam 111 is formed with an opening 111x for providing a moving passage for pressing a button. The opening 111x formed by the waterproof foam 111 corresponds to a position where the button switch 130 is located, and the opening 111x of the waterproof foam 111 provides a moving passage when the button 140 is pressed.

In one embodiment, the waterproof film 112 is made of an elastic plastic, such as polyethylene terephthalate (PET). In other embodiments, the waterproof film 112 may also be other plastic or elastomeric materials that are water resistant, such as silica gel. A thickness of the waterproof film 112 is equal to about 0.05 mm. In other embodiments, the thickness of the waterproof film 112 can be designed according to actual conditions.

In one embodiment, the waterproof film 112 has a substantially rectangular shape, the waterproof foam 111 has a same size as the waterproof film 112. In other embodiments, the waterproof foam 111 and the waterproof film 112 are not limited to the shape and size as described. For example, according to a design of the housing 120, the button switch 130, and the button 140, a shape of the waterproof foam 111 may be hollow square, hollow elliptical, or irregular hollow shape, and the waterproof film 112 may correspondingly be square, elliptical, or irregular shape. The button 140 and the housing 120 can be connected by a buckle or other connection structure not described herein.

Referring to FIG. 1 and FIG. 2 again, an adhesive 111y is located between the waterproof film 112 and the waterproof foam 111. The waterproof film 112 and the waterproof foam 111 are adhered to each other through the adhesive 111y, and an outer edge contour of the waterproof foam 111 is the same as and aligned with an outer edge contour of the waterproof film 112. In order to ensure good adhesion and thus good waterproof performance, an effective bonding width of the waterproof foam 111 is not less than 1.2 mm, and the effective bonding width may be 1.2 mm, 1.4 mm, or 1.7 mm. The effective bonding width refers to a distance of the waterproof foam 111 in a direction from an inner edge to an outer edge, such as a width A in FIG. 3. It can be understood that the effective bonding width equals a width of the adhesive 111y from the inner edge to the outer edge of the waterproof foam 111.

An outer surface of the housing 120 forms a groove 160 for accommodating the button switch 130. A side of the waterproof foam 111 facing the groove 160 is provided with an adhesive 111z. The waterproof foam 111 is adhered to the outer surface of the housing 120 through the adhesive 111z to surround the opening of the groove 160, and the waterproof film 112 completely covers the groove 160 to seal the button switch 130 in the groove 160. The cover plate 141 and the button 140 cover the housing 120, and the waterproof partition 110 is located between the housing 120 and the cover plate 141. In one embodiment, an opening of the waterproof foam 111 may correspond to one or more of the button switches 130.

Referring to FIG. 1, the electronic device 10 further includes a button circuit board 150. The button circuit board 150 is electrically connected to the button switch 130. When the button 140 presses the button switch 130, the button circuit board 150 outputs a corresponding pressing signal. The button circuit board 150 may be a flexible circuit board made of polyimide or polyester film.

In the related art, in order to avoid water seepage, an O-ring is often subjected to an interference fit with the button, which decreases a tactile feeling of the button. In contrast, the thin waterproof film 112 provided by the current disclosure has better elasticity when pressed, which improves a tactile feeling of the button 140 when pressed. Further, a thickness of the waterproof foam 111 is not less than 0.5 mm, such as 0.5 mm, 0.6 mm, or 0.8 mm, which maintains elasticity of the waterproof partition 110 when pressed. Since the waterproof foam 111 has deformability, the waterproof foam 111 can compensate for assembly error of related components, thereby contributing to improvement of tactile feeling of the button 140.

Moisture is blocked by the waterproof film 112 and cannot enter the inside of the electronic device 10 through a slit of the button 140. The waterproof partition 110 has a simple structure, and thus is easy to install, disassemble, and repair, is advantageous for improving the efficiency of manufacturing and maintenance, and is advantageous for reducing the defect rate. Moreover, since the cost of the waterproof foam 111 and the waterproof film 112 is low, it is not necessary to design a complicated assembly structure for the button 140, which is advantageous for saving manufacturing and maintenance costs, and the overall system cost is low.

The embodiments shown and described above are only examples. Even though numerous characteristics and advantages of the present technology have been set forth in the foregoing description, together with details of the structure and function of the present disclosure, the disclosure is illustrative only, and changes may be made in the detail, including in matters of shape, size and arrangement of the parts within the principles of the present disclosure up to, and including, the full extent established by the broad general meaning of the terms used in the claims.

What is claimed is:

1. A waterproof button structure comprising:
   a housing comprising at least one button switch;
   a cover plate covering the at least one button switch, the cover plate comprising at least one button which can be pressed, the at least one button switch being in one-to-one correspondence with the at least one button; and
   a waterproof partition located between the housing and the cover plate; wherein:
   a waterproof film of the waterproof partition is adjacent to the cover plate;
   a waterproof foam of the waterproof partition is adjacent to the housing;
   the waterproof foam is formed with an opening for providing a moving passage for pressing the at least one button such that when the at least one button is pressed, the at least one button is abutted by the waterproof film, and the at least one button switch is activated.

2. The waterproof button structure of claim 1, wherein:
   an outer surface of the housing forms a groove for receiving the at least one button switch;
   the waterproof film completely covers the groove to seal the at least one button switch in the groove.

3. The waterproof button structure of claim 2, wherein:
   a side of the waterproof foam facing the groove is provided with an adhesive;
   the waterproof foam is adhered to the outer surface of the housing by the adhesive, the waterproof foam surrounds an opening of the groove.

4. The waterproof button structure of claim 3, wherein:
   the waterproof film is made of polyethylene terephthalate.

5. The waterproof button structure of claim 3, wherein:
   an adhesive is located between the waterproof film and the waterproof foam, the waterproof film and the waterproof foam are adhered together by the adhesive.

6. The waterproof button structure of claim 3, wherein:
   a thickness of the waterproof foam is not less than 0.5 mm.

7. The waterproof button structure of claim 3, wherein:
   an effective bonding width of the waterproof foam is not less than 1.2 mm.

8. An electronic device comprising:
   a circuit board; and
   a waterproof button structure coupled to the circuit board, the waterproof button structure comprising:
   a housing comprising at least one button switch;
   a cover plate covering the at least one button switch, the cover plate comprising at least one button which can be pressed, the at least one button switch being in one-to-one correspondence with the at least one button; and
   a waterproof partition located between the housing and the cover plate; wherein:
   a waterproof film of the waterproof partition is adjacent to the cover plate;
   a waterproof foam of the waterproof partition is adjacent to the housing;
   the waterproof foam is formed with an opening for providing a moving passage for pressing the at least one button such that when the at least one button is pressed, the at least one button is abutted by the waterproof film, and the at least one button switch is activated; and
   when the at least one button switch is activated, the circuit board outputs a corresponding pressing signal.

9. The electronic device of claim 8, wherein:
   an outer surface of the housing forms a groove for receiving the at least one button switch;
   the waterproof film completely covers the groove and seals the at least one button switch in the groove.

10. The electronic device of claim 9, wherein:
   a side of the waterproof foam facing the groove is provided with an adhesive;

the waterproof foam is adhered to the outer surface of the housing by the adhesive, the waterproof foam surrounds an opening of the groove.

11. The electronic device of claim 10, wherein:
an adhesive is located between the waterproof film and the waterproof foam, the waterproof film and the waterproof foam are adhered together by the adhesive.

12. The electronic device of claim 11, wherein:
a thickness of the waterproof foam is not less than 0.5 mm.

13. The electronic device of claim 11, wherein:
an effective bonding width of the waterproof foam is not less than 1.2 mm.

* * * * *